United States Patent
Horita et al.

(10) Patent No.: US 10,400,846 B2
(45) Date of Patent: Sep. 3, 2019

(54) ROTARY DAMPER

(71) Applicant: OILES CORPORATION, Tokyo (JP)

(72) Inventors: Naohiro Horita, Fujisawa (JP); Ryohei Kaneko, Fujisawa (JP); Hiroshi Watanabe, Fujisawa (JP); Wataru Nishioka, Fujisawa (JP)

(73) Assignee: OILES CORPORATION, Tokyo (JP)

( * ) Notice: Subject to any disclaimer, the term of this patent is extended or adjusted under 35 U.S.C. 154(b) by 0 days.

(21) Appl. No.: 15/525,152

(22) PCT Filed: Nov. 6, 2015

(86) PCT No.: PCT/JP2015/081376
§ 371 (c)(1),
(2) Date: May 8, 2017

(87) PCT Pub. No.: WO2016/076234
PCT Pub. Date: May 19, 2016

(65) Prior Publication Data
US 2017/0321780 A1   Nov. 9, 2017

(30) Foreign Application Priority Data
Nov. 11, 2014   (JP) .................................. 2014-229354

(51) Int. Cl.
*F16F 9/44* (2006.01)
*F16F 9/14* (2006.01)
*F16F 9/12* (2006.01)

(52) U.S. Cl.
CPC ................ *F16F 9/44* (2013.01); *F16F 9/125* (2013.01); *F16F 9/14* (2013.01); *F16F 9/145* (2013.01);
(Continued)

(58) Field of Classification Search
CPC ...... F16F 9/145; F16F 9/14; F16F 9/34; F16F 2232/02; F16F 7/026; F16F 9/369;
(Continued)

(56) References Cited

U.S. PATENT DOCUMENTS

| | | | | |
|---|---|---|---|---|
| 4,674,608 A | * | 6/1987 | Morris | B60G 15/06 188/290 |
| 5,152,189 A | * | 10/1992 | Miura | F16F 9/145 464/180 |

(Continued)

FOREIGN PATENT DOCUMENTS

| | | |
|---|---|---|
| CN | 201265619 | 7/2009 |
| CN | 102829123 | 12/2012 |

(Continued)

OTHER PUBLICATIONS

International Search Report for PCT/JP2015/081376, dated Jan. 26, 2016, 4 pages.

(Continued)

*Primary Examiner* — Bradley T King
*Assistant Examiner* — Mahbubur Rashid
(74) *Attorney, Agent, or Firm* — Nixon & Vanderhye P.C.

(57) ABSTRACT

[Problem] To provide a rotary damper wherein damping torque generated by rotation can be easily adjusted using a simple configuration. [Solution] A rotary damper 1 limits the movement of viscous fluid contained in a circular cylinder chamber 111, thereby generating damping torque against applied rotational force. This rotary damper 1 is configured such that: a lid 15 is screwed into a case 11; and the gap g1 between the lower surface 153 of the lid 15 and the upper surface 119 of a partition section 115 and the gap g2 between the lower surface 153 of the lid 15 and the upper surface 129 of a vane 122 can be adjusted by adjusting the amount of screwing of the lid 15 into the case 11. This means that (Continued)

adjusting the amount of movement of viscous fluid through the gaps g1, g2 can adjust damping torque generated by rotation.

10 Claims, 10 Drawing Sheets

(52) U.S. Cl.
CPC ..... *F16F 2230/186* (2013.01); *F16F 2232/02* (2013.01)

(58) Field of Classification Search
CPC .... F16F 15/165; F16F 2230/30; F16F 9/3242; F16F 9/346
USPC .......................................................... 188/290
See application file for complete search history.

(56) References Cited

U.S. PATENT DOCUMENTS

| | | | |
|---|---|---|---|
| 5,301,775 A | 4/1994 | Nedbal et al. | |
| 6,318,522 B1 * | 11/2001 | Johnston | B60G 3/202 188/267.2 |
| 7,111,712 B2 * | 9/2006 | Orita | F16F 9/145 188/290 |
| 2002/0007993 A1 * | 1/2002 | Kobori | F16F 9/145 188/290 |
| 2002/0179387 A1 * | 12/2002 | Orita | E05F 5/10 188/290 |
| 2003/0150678 A1 * | 8/2003 | Iwashita | A47K 13/12 188/296 |
| 2003/0234145 A1 * | 12/2003 | Iwashita | A47K 13/12 188/290 |
| 2009/0266660 A1 * | 10/2009 | Saito | F16F 9/145 188/290 |
| 2014/0020994 A1 * | 1/2014 | Okimura | B60N 2/22 188/282.1 |
| 2014/0035310 A1 * | 2/2014 | Ozaki | E05F 5/025 296/50 |
| 2014/0190779 A1 * | 7/2014 | Horita | F16F 9/145 188/282.1 |

FOREIGN PATENT DOCUMENTS

| | | | | |
|---|---|---|---|---|
| DE | 10 2004 032 172 | | 1/2006 | |
| GB | 2246185 A | * | 1/1992 | ............. A47C 17/38 |
| JP | 4-32 | | 1/1992 | |
| JP | 7-27163 | | 1/1995 | |
| JP | 7-301272 | | 11/1995 | |
| JP | 2002-266922 | | 9/2002 | |
| JP | 2003-287076 | | 10/2003 | |
| JP | 2006-300088 | | 11/2006 | |
| JP | 2007-198444 | | 8/2007 | |
| JP | 2014-190502 | | 10/2014 | |
| WO | WO 2012/141242 | | 10/2012 | |

OTHER PUBLICATIONS

Search Report issued in CN Appln. No. 2015800622356 dated Jun. 26, 2018 (w/ translation).

Supplementary European Search Report in Application No. EP 15859799.7 dated Jun. 7, 2018 (2 pages).

* cited by examiner

Fig.8
(A)
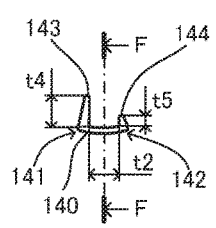
(B)
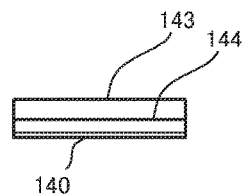
(C)
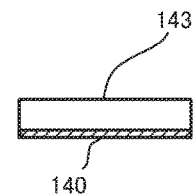

Fig. 10
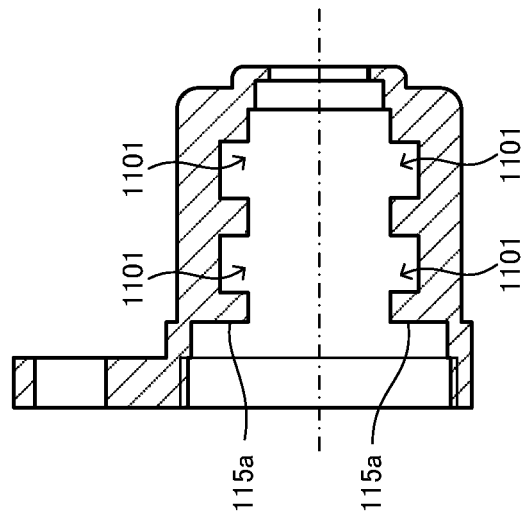
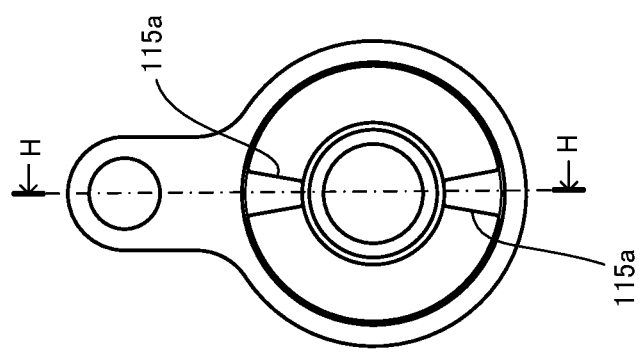

ROTARY DAMPER

This application is the U.S. national phase of International Application No. PCT/JP2015/081376 filed 6 Nov. 2015, which designated the U.S. and claims priority to jp Patent Application No. 2014-229354 filed 11 Nov. 2014, the entire contents of each of which are hereby incorporated by reference.

TECHNICAL FIELD

The present invention relates to a rotary damper, and in particular to a rotary damper that can adjust damping torque generated by rotation.

BACKGROUND ART

There is known a rotary damper that generates larger damping torque against rotation in the normal direction and generates smaller damping torque against rotation in the reverse direction. For example, the Patent Literature 1 discloses a rotary damper that is simple in construction and can be produced at low cost.

The rotary damper described in the Patent Literature 1 comprises: a case having a circular cylinder chamber; a rotor rotatably received in the circular cylinder chamber; viscous fluid filled in the circular cylinder chamber; and a lid fixed to the opening-side end surface of the case, to enclose the rotor and the viscous fluid within the circular cylinder chamber.

The rotor comprises: a rotor body of a circular cylinder shape; and vanes, each of which is formed to project outward in radial direction from the outer peripheral surface of the rotor body so as to form a small gap between the vane and the sidewall surface of the circular cylinder chamber. In each vane, is formed a flow path running from vane's one side surface (referred to as first side surface) that is perpendicular to the rotational direction of the rotor to the other side surface (referred to as second side surface). Onto the end surface (i.e. surface facing the sidewall surface of the circular cylinder chamber) of each vane, is attached a seal member to fill the small gap between the vane and the sidewall surface of the circular cylinder chamber. The seal member has a check valve of elastic body, which opens and closes the flow path formed in the vane. On the sidewall surface of the circular cylinder chamber, are formed partition members each projecting inward in radial direction so that a small gap is formed between each partition member and the outer peripheral surface of the rotor body.

In the rotary damper of the above construction described in the Patent Literature 1, when force that rotates the rotor in the direction (normal direction) from the first side surface to the second side surface of each vane is applied to the rotor, the viscous fluid in the circular cylinder chamber presses the check valves respectively against the second side surfaces of the vanes, and the flow paths are blocked by the check valves. As a result, movement of the viscous fluid is limited to only through the gap between the partition member of the circular cylinder chamber and the outer peripheral surface of the rotor body and the gap between the closing-side end surface (i.e. bottom surface) of the case and the lower surfaces (surfaces facing the closing-side end surface of the case) of the vanes. Accordingly, the pressure of the vanes against the viscous fluid on the side of the second side surface becomes a high pressure, and large damping torque is generated. On the other hand, when force that rotates the rotor in the direction (reverse direction) from the second side surface to the first side surface of each vane is applied to the rotor, the viscous fluid flows into each flow path from the side of the first side surface, to push up the check valve concerned and open the flow path. Accordingly, the viscous fluid moves also through the flow paths formed in the vanes, and thus the pressure of the vanes against the viscous fluid on the side of the first side surface does not become a high pressure, and small damping torque is generated.

The rotary damper described in the Patent Literature 1 further comprises a damping force adjustment mechanism for adjusting the larger damping torque generated when force rotating the rotor in the normal direction is applied to the rotor. This damping force adjustment mechanism comprises: an elastic member that is placed between the opening-side end surface of the case and the lid; and a plurality of bolts for fixing the lid onto the opening-side end surface of the case via the elastic member being interposed therebetween. In the opening-side end surface of the case, are formed a plurality of threaded holes. And through-holes are formed in the elastic member and the lid at positions corresponding to the threaded holes. Bolts are inserted into the respective through holes in the lid and the elastic member, and screwed into the respective threaded holes formed in the opening-side end surface of the case. The degree of pushing the rotor by the lid into the inside of the circular cylinder chamber of the case is adjusted by the degree of screwing of the bolts. As a result, the gap between the closing-side end surface of the case and the lower surfaces of the vanes is adjusted, and this makes it possible to adjust the larger damping torque generated when force rotating the rotor in the normal direction is applied to the rotor.

CITATION LIST

Patent Literature

Patent Literature 1: Japanese Unexamined Patent Application Laid-Open No. 7-301272

SUMMARY OF INVENTION

Technical Problem

However, the number of parts of the rotary damper described in the Patent Literature 1 increases, since the damping force adjustment mechanism of the rotary damper comprises: the elastic member placed between the opening-side end surface of the case and the lid; and the bolts for fixing the lid onto the opening-side end surface of the case via the elastic member being interposed therebetween. Further, to position the rotor properly in the circular cylinder chamber, each bolt should be screwed in the same degree so that the degree of pushing the rotor by the lid becomes uniform over the whole surface of the lid. As a result, work of adjusting the damping torque becomes troublesome.

The present invention has been made considering the above situation, and an object of the invention is to provide a rotary damper that is simple in structure and can easily adjust damping torque generated by rotation.

Solution to Problem

To solve the above problem, the present invention provides a rotary damper that generates damping torque against applied rotational force, by limiting movement of filled viscous fluid, wherein: the rotary damper comprises a lid, which is screwed into a case of the rotary damper; and the damping torque generated by rotation can be adjusted by degree of screwing of the lid into the case. When the degree of screwing of the lid into the case is adjusted, at least either a gap between the back surface of the lid and vanes' surfaces facing the back surface of the lid or a gap between the back surface of the lid and partition members' surfaces facing the back surface of the lid are adjusted. Thereby, the amount of movement of the viscous fluid through the gap is adjusted, and the damping torque generated by rotation is adjusted.

For example, the present invention provides a rotary damper that generates damping torque against applied rotational force by limiting movement of viscous fluid, wherein:

the rotary damper comprises:

a case which is open at one end and has a circular cylinder chamber filled with the viscous fluid;

a rotor which is received in the circular cylinder chamber rotatably relative to the circular cylinder chamber; and a lid which is fitted to an opening side of the circular cylinder chamber, to enclose the rotor together with the viscous fluid within the circular cylinder chamber;

the rotor comprises:

a rotor body of a circular cylinder shape; and a vane which projects outward in radial direction from an outer peripheral surface of the rotor body, and an end surface of which comes close to a sidewall surface of the circular cylinder chamber so as to partition the circular cylinder chamber;

the case comprises:

a partition member which projects inward in a radial direction from the side wall surface of the circular cylinder chamber, and an end surface of which comes close to the outer peripheral surface of the rotor body so as to partition the circular cylinder chamber; and a female screw portion formed in the sidewall surface of the circular cylinder chamber on the opening side of the circular cylinder chamber;

the lid comprises:

a male screw portion formed in an outer peripheral surface of the lid, to be engaged with the female screw portion formed in the sidewall surface of the circular cylinder chamber on the opening side of the circular cylinder chamber; and at least either a gap between aback surface of the lid and vanes' surface facing the back surface of the lid or a gap between the back surface of the lid and partition members' surface facing the back surface of the lid functions as a flow path that limit movement of the viscous fluid and can be adjusted by adjusting degree of screwing of the lid into the circular cylinder chamber.

Here, the rotary damper may comprise a first seal member which fills a gap between the end surface of the partition member and the outer peripheral surface of the rotor body. Further, the rotary damper may comprise a second seal member which fills a gap between the end surface of the vane and the sidewall surface of the circular cylinder chamber.

Further, the rotary damper may further comprise: a flow path which is formed in the partition member or the vane, and runs through between both side surfaces of the partition member or the vane along a rotational direction of the rotor; and a check valves which closes the flow path when the rotor rotates in a normal direction relative to the circular cylinder chamber, and opens the flow path when the rotor rotates in a reverse direction relative to the circular cylinder chamber. Here, in the case where the rotary damper comprises the first seal member or the second seal member, the check valve may be formed integrally with the first seal member or the second seal member.

Advantageous Effects of Invention

According to the present invention, the lid is screwed into the case, and it is possible to adjust at least either the gap between the lid and the partition member of the circular cylinder chamber or the gap between the lid and the vane. As a result, damping torque generated by rotation can be adjusted, in simple construction without increasing the number of parts, by simple work of adjusting the amount of movement of the viscous fluid that moves through the gap.

BRIEF DESCRIPTION OF DRAWINGS

FIGS. 8(A) and 8(B) are respectively a front view and a side view of a second sealmember 14, and FIG. 8(C) is an F-F cross-section view of the second seal member 14 shown in FIG. 8(A);

Fig. 10(A) is a front view of the case 11, and Fig. 10(B) is H-H cross-section view of the case 11 shown in Fig. 10(A).

DESCRIPTION OF EMBODIMENTS

Figure 1:
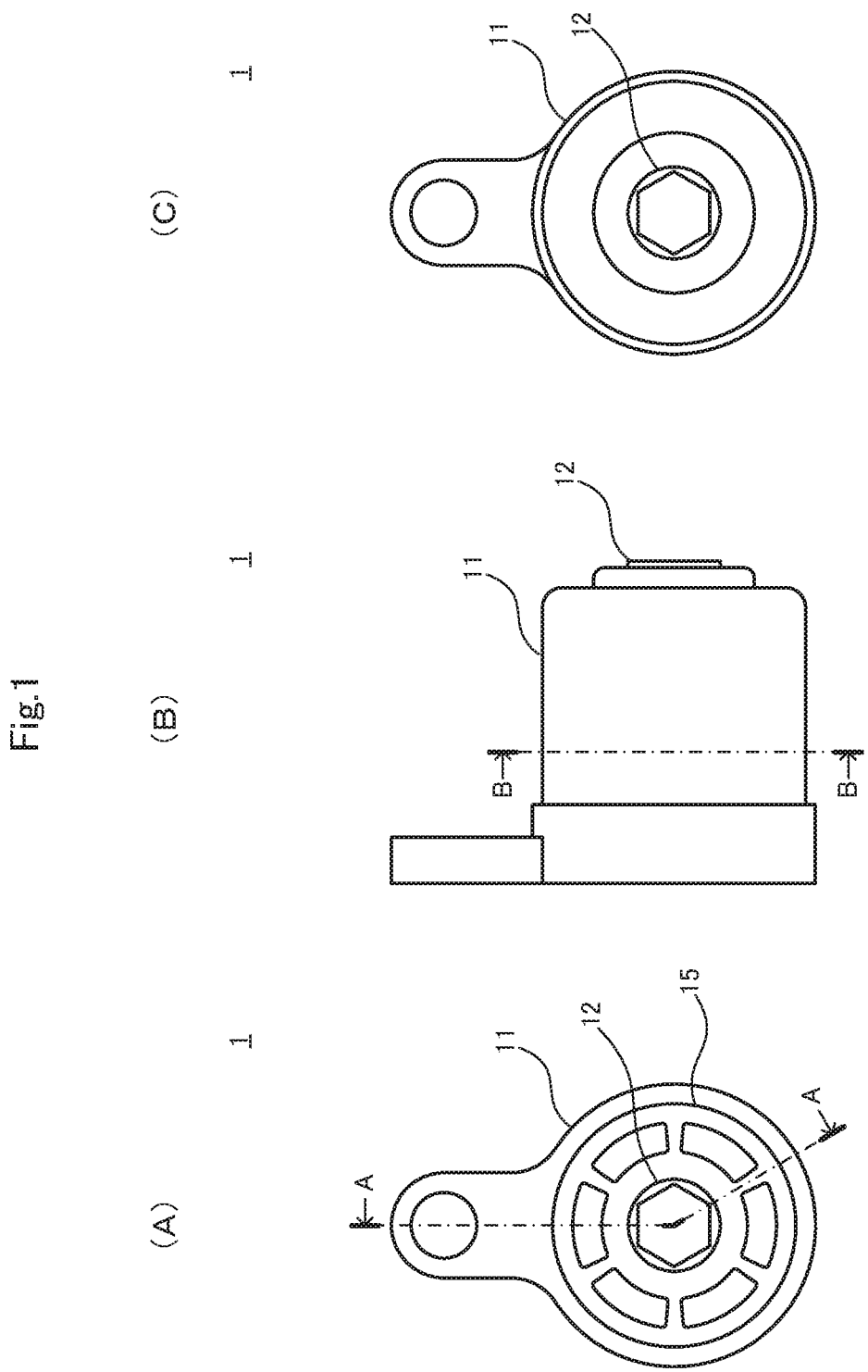
FIGS. 1(A)-1(C) are respectively a front view, a side view, and a back view of a rotary damper 1 according to one embodiment of the present invention.

In the following, one embodiment of the present invention will be described referring to the drawings.

Figure 2:
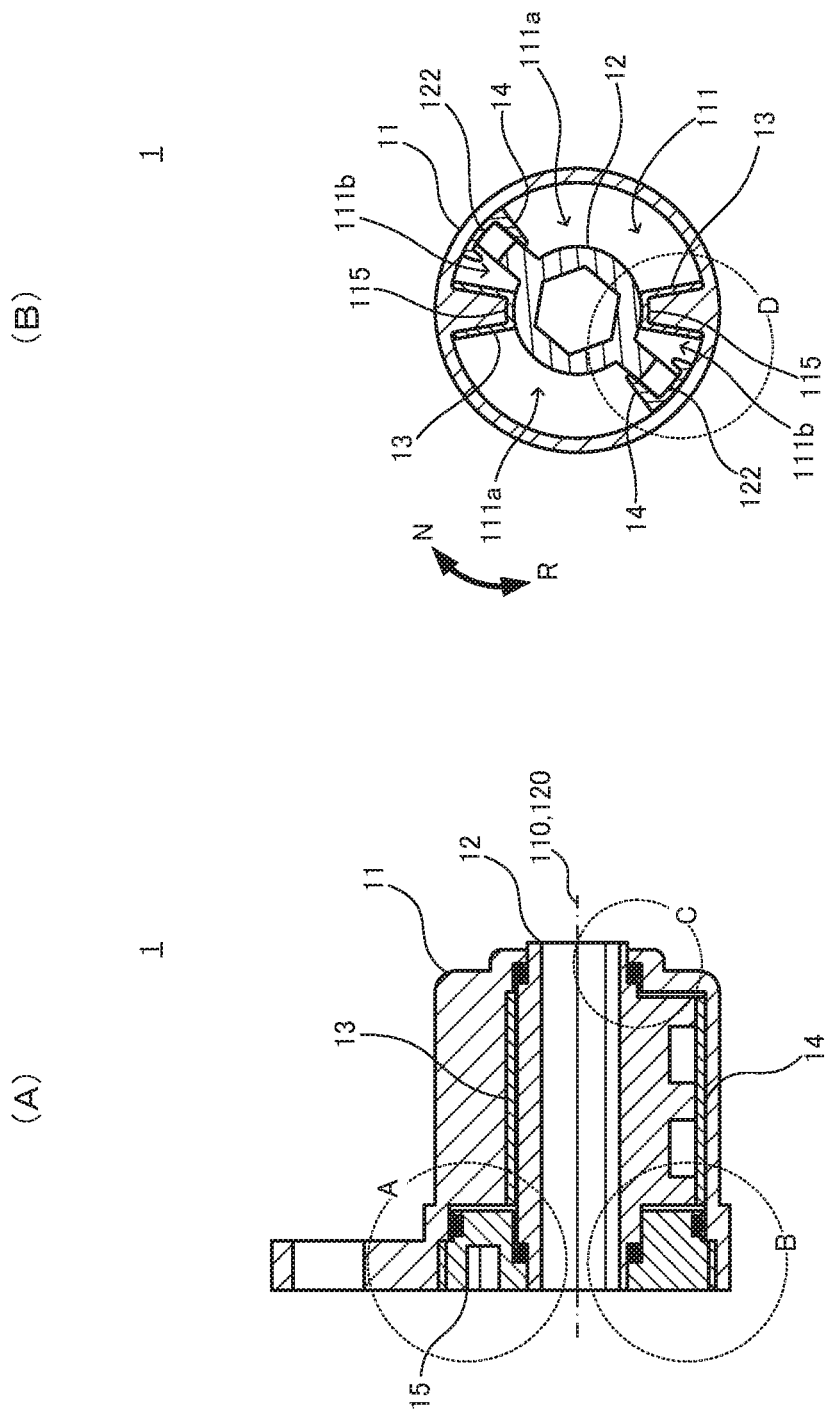
FIG. 2(A) is an A-A cross-section view of the rotary damper 1 shown in FIG. 1(A)
FIG. 2(B) is a B-B cross-section view of the rotary damper 1 shown in FIG. 1(B)
Figure 3:
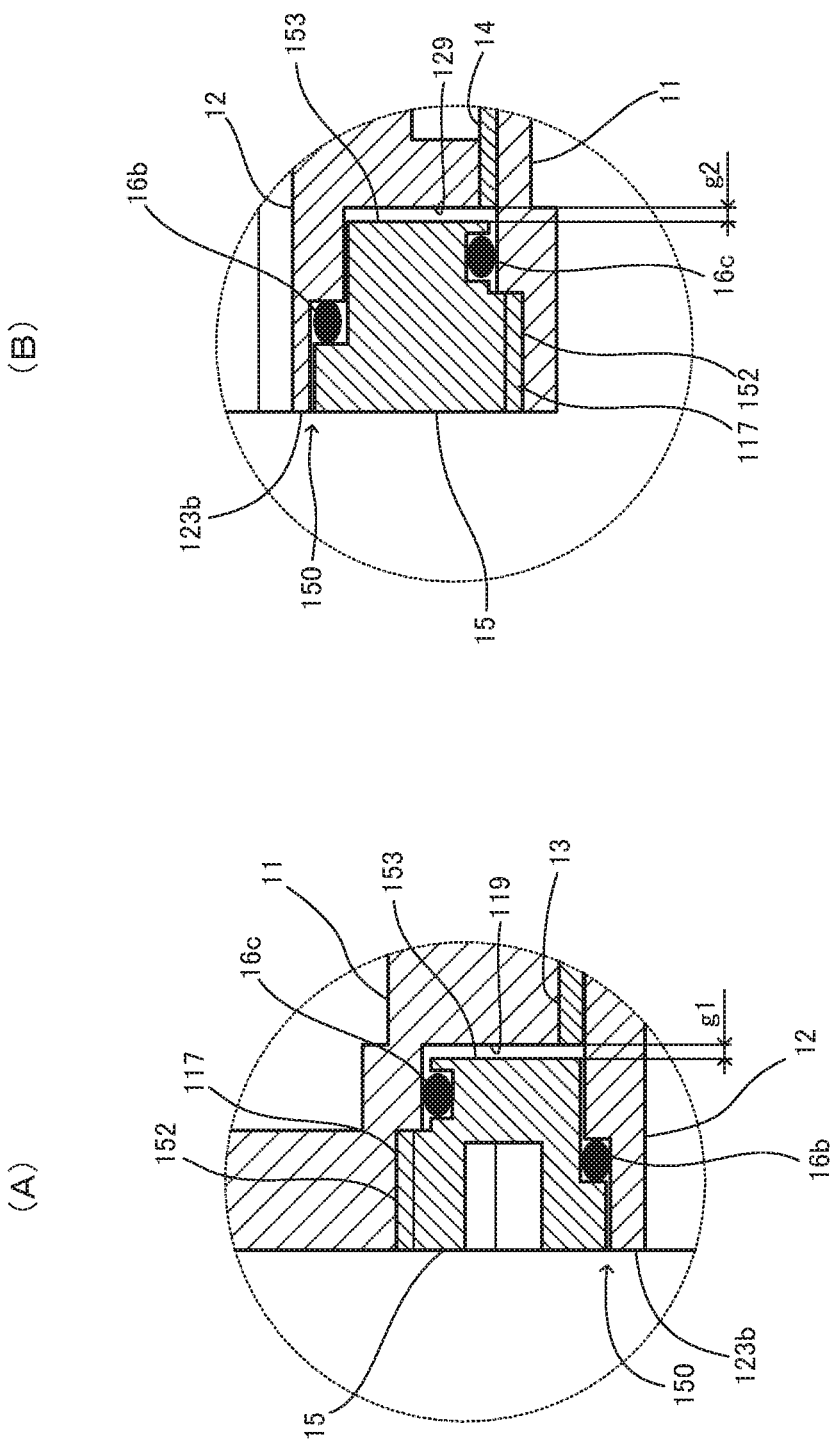
FIGS. 3(A) and 3(B) are respectively an enlarged view of the part A and an enlarged view of the part B of the rotary damper 1 shown in FIG. 2(A)
Figure 4:
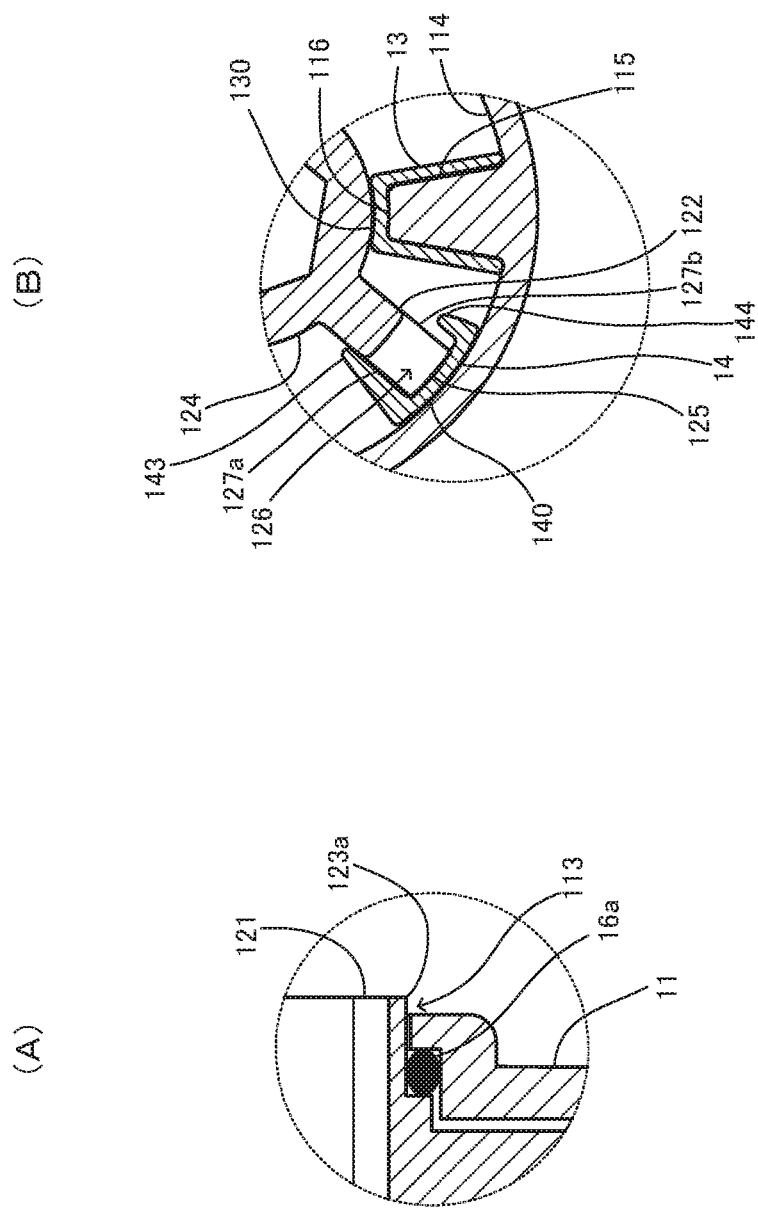
FIG. 4(A) is an enlarged view of the part C of the rotary damper 1 shown in FIG. 2(A)
FIG. 4(B) is an enlarged view of the part D of the rotary damper 1 shown in FIG. 2(B)

FIGS. 1(A)-1(C) are respectively a front view, a side view, and a back view of a rotary damper 1 according to one embodiment of the present invention. FIG. 2(A) is an A-A cross-section view of the rotary damper 1 shown in FIG. 1(A), and FIG. 2(B) is a B-B cross-section view of the rotary damper 1 shown in FIG. 1(B). FIGS. 3(A) and 3(B) are respectively an enlarged view of the part A and an enlarged view of the part B of the rotary damper 1 shown in FIG. 2(A). And FIG. 4(A) is an enlarged view of the part C of the rotary damper 1 shown in FIG. 2(A), and FIG. 4(B) is an enlarged view of the part D of the rotary damper 1 shown in FIG. 2(B).

As shown in the figures, the rotary damper 1 of the present embodiment comprises: a case 11; a rotor 12 which is received in the case 11 in a rotatable manner relative to the case 11; viscous fluid (not shown) such as oil, silicone, or the like filled in the case 11; and a lid 15 which enclose the rotor 12 and the viscous fluid within the case 11.

Figure 5:
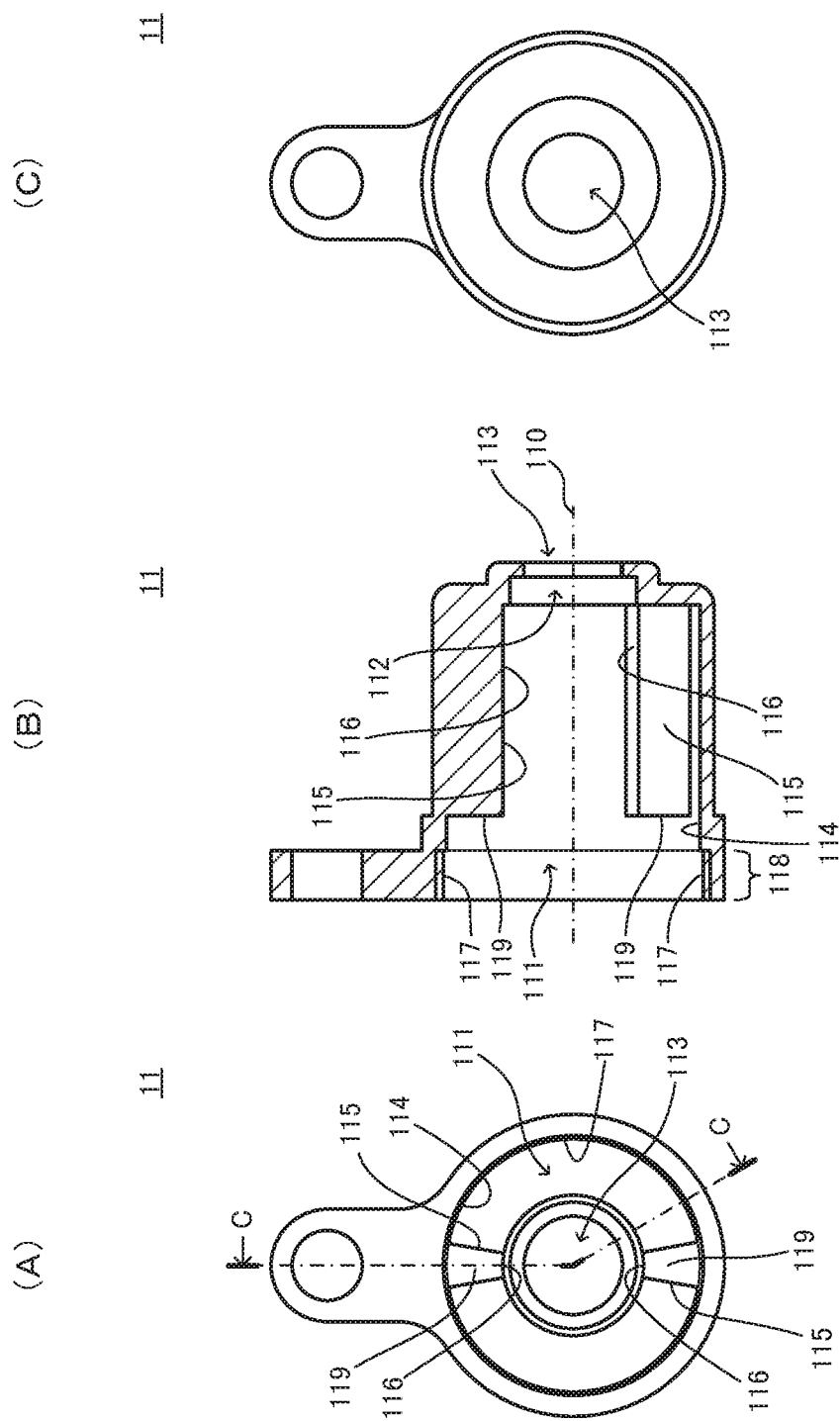
FIG. 5(A) is a front view of the case 11.
FIG. 5(B) is a C-C cross-section view of the case 11 shown in FIG. 5(A)
FIG. 5(C) is a back view of the case 11.

FIG. 5(A) is a front view of the case 11, FIG. 5(B) is a C-C cross-section view of the case 11 shown in FIG. 5(A), and FIG. 5(C) is a back view of the case 11.

Figure 6:
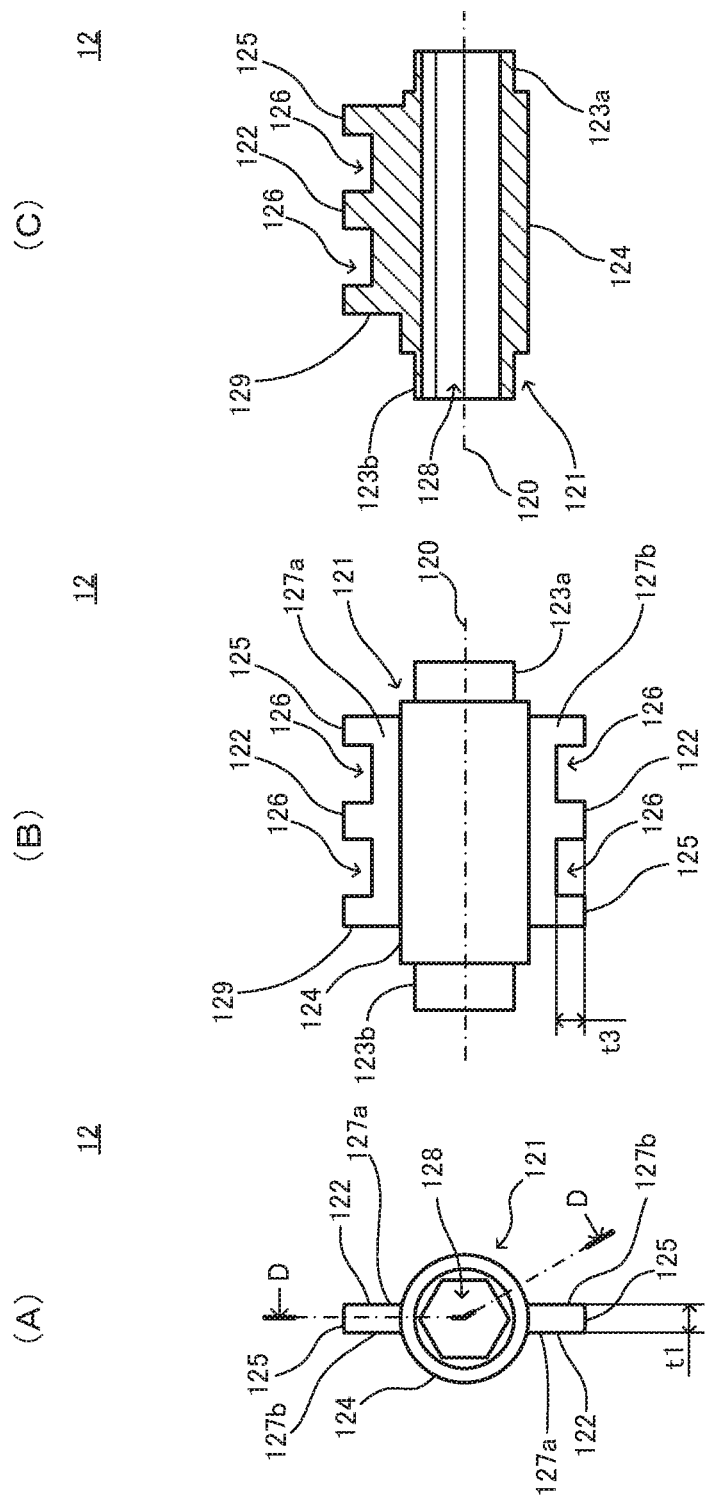
FIGS. 6(A) and 6(B) are respectively a front view and a side view of the rotor 12.
FIG. 6(C) is a D-D cross-section view of the rotor 12 shown in FIG. 6(A)
Figure 9:
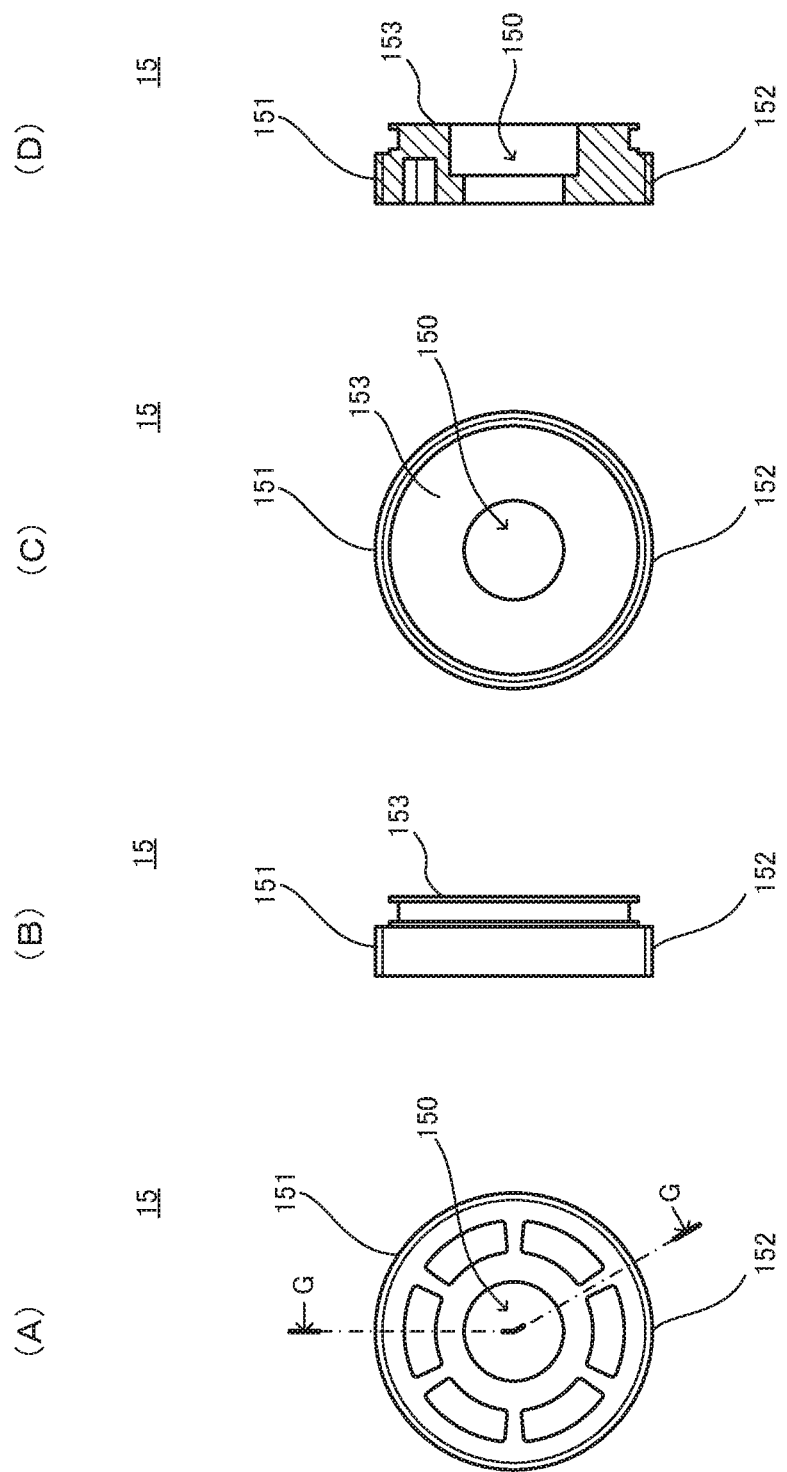
FIGS. 9(A)-9(C) are respectively a front view, a side view, and a back view of the lid 15.
FIG. 9(D) is a G-G cross-section view of the lid 15 shown in FIG.9(A)

As shown in the figures, a circular cylinder chamber 111 (i.e. a space having a circular cylinder shape with a bottom) opened at one end is formed in the case 11. An opening 113 for inserting the rotor 12 is formed in the bottom 112 of the circular cylinder chamber 111. When a lower end portion 123a (See FIG. 6) of a below-described rotor body 121 of the rotor 12 is inserted into the opening 113, the rotor 12 is received in the circular cylinder chamber 111 so that the rotation axis 120 of the rotor 12 coincides with the center line of the circular cylinder chamber 111 (See FIG. 2(A) and FIG. 4(A)). Further, in the sidewall surface 114 of the circular cylinder chamber 111, a pair of partition members 115 is formed along the center line 110 of the circular cylinder chamber 111 axisymmetrically with respect to the center line 110. The end surface 116 of each partition member 115 is close to the outer peripheral surface 124 (See FIG. 6) of the below-described rotor body 121 of the rotor 12, so that the partition members 115 partition the circular cylinder chamber 111. Onto each partition member 115, a below-described first seal member 13 (See FIG. 4(B)) is fitted. Further, on the opening side 118 of the sidewall surface 114 of the circular cylinder chamber 111, a female screw portion 117 is formed. The female screw portion 117 engages with the below-described male screw portion 152 (See FIG. 9) of the lid 15.

FIGS. 6(A) and 6(B) are respectively a front view and a side view of the rotor 12, and FIG. 6(C) is a D-D cross-section view of the rotor 12 shown in FIG. 6(A).

As shown in the figures, the rotor 12 comprises: the rotor body 121 having a circular cylinder shape; and a pair of vanes (rotating wing s) 122 which are formed axisymmetrically with respect to the rotation axis 120 of the rotor 12. Each vane 122 is formed along the rotation axis 120 of the rotor 12 and projects outward in radial direction from an outer peripheral surface 124 of the rotor body 121. Thereby, the end surface 125 of each vane 122 is close to the sidewall surface 114 of the circular cylinder chamber 111 of the case, so that the vanes 122 partition the circular cylinder chamber 111. In each vane 122, flow paths 126 are formed. The flow paths 126 run through between both side surfaces 127a and 127b of the vane 122, along the rotational direction of the rotor 12. Further, the below-described second seal member 14 (See FIG. 4(B)) is fitted onto each vane 122.

In the rotor body 121, a through-hole 128 centered at the rotation axis 120 of the rotor 12 is formed. The through-hole 128 is for inserting a hexagon shaft (not shown) for transmitting rotational force applied from the outside to the rotor 12. The lower end portion 123a of the rotor body 121 is rotatably inserted into the opening 113 formed in the bottom 112 of the circular cylinder chamber 111 of the case 11 (See FIG. 2(A) and FIG. 4(A)). An upper end portion 123b of the rotor body 121 is rotatably inserted into a below-described opening 150 (See FIG. 9) of the lid 15 (See FIG. 2(A), FIG. 3(A), and FIG. 3(B)).

To prevent leakage of the viscous fluid from the opening 113 of the circular cylinder chamber 111 to the outside, seal members such as O-rings 16a (See FIG. 4(A)) may be interposed between the lower end portion 123a of the rotor body 121 and the opening 113 of the circular cylinder chamber 111.

Figure 7:
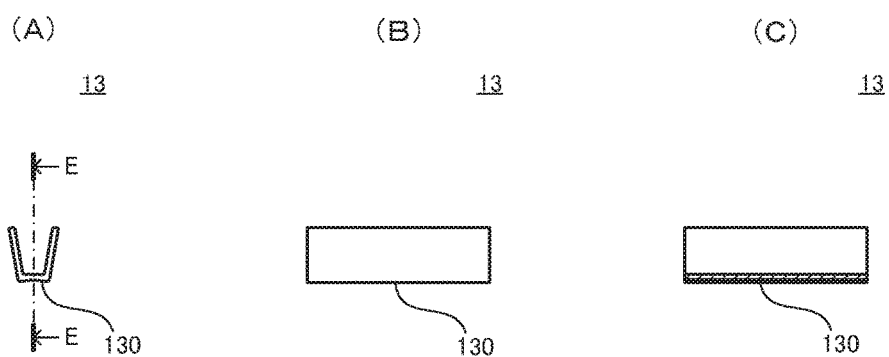
FIGS. 7(A) and 7(B) are respectively a front view and a side view of a first seal member 13.
FIG. 7(C) is an E-E cross-section view of the first seal member 13 shown in FIG. 7(A)

FIGS. 7(A) and 7(B) are respectively a front view and a side view of a first seal member 13, and FIG. 7(C) is an E-E cross-section view of the first seal member 13 shown in FIG. 7(A).

As shown in the figures, each first seal member 13 is a U-shaped member that can be fitted onto a partition member 115 formed in the circular cylinder chamber 111 of the case 11. A bottom 130 (See FIG. 4(B)) of the first seal member 13 is interposed between the end surface 116 of the partition member 115 and the outer peripheral surface 124 of the rotor body 121 of the rotor 12, so as to fill the gap between the end surface 116 of the partition member 115 and the outer peripheral surface 124 of the rotor body 121. As the material of the first seal members 13, it is favorable to use resin having superior sliding properties such as polyamide, because the first seal members 13 are located between the case 11 and the rotor 12 that relatively rotate to each other.

FIGS. 8(A) and 8(B) are relatively a front view and a side view of a second seal member 14, and FIG. 8(C) is an F-F cross-section view of the second seal member 14 shown in FIG. 8(A).

As shown in the figures, each second seal member 14 is a U-shaped member that can be fitted onto a vane 122 of the rotor 12. Each second seal member 14 comprises: a bottom 140 having the width t2 longer than the width t1 (See FIG. 6(A)) of each vane 122, in the rotational direction; a first leg portion 143 which is formed integrally with the bottom 140 at one end 141 of the bottom 140 and has the width t4 longer than the width t3 (See FIG. 6(B)) of the flow path 126 formed in each vane 122, in the radial direction; and a second leg portion 144 which is formed integrally with the bottom 140 at the other end 142 of the bottom 140 and has the width t5 shorter than the width t3 of the flow path 126 formed in each vane 122, in the radial direction.

Each second seal member 14 fitted on a vane 122 fills the gap between the end surface 125 of the vane 122 and the sidewall surface 114 of the circular cylinder chamber 111 of the case 11, because the bottom 140 (See FIG. 4(B)) of the second seal member 14 is interposed between the end surface 125 of the vane 122 in question and the sidewall surface 114 of the circular cylinder chamber 111. As shown in FIG. 2(B), when the rotor 12 rotates in the normal direction N relative to the circular cylinder chamber 111 of the case 11, the first leg portion 143 of each second seal member 14 is abutted against one side surface 127a of the vane 122, to close the flow path 126 formed in the vane 122. On the other hand, when the rotor 12 rotates in the reverse direction R relative to the circular cylinder chamber 111 of the case 11, the first leg portion 143 of each second seal member 14 is separated from the side surface 127a of the vane 122, and the second leg portion 144 (See FIG. 4(B)) is abutted against the other side surface 127b of the vane 122, to open the flow path 126 formed in the vane 122. As the material of the second seal members 14, it is favorable to use resin having superior sliding properties such as polyamide, because the second seal members 14 are located between the case 11 and the rotor 12 that relatively rotate to each other.

FIGS. 9(A)-9(C) are respectively a front view, a side view, and a back view of the lid 15, and FIG. 9(D) is a G-G cross-section view of the lid 15 shown in FIG. 9(A).

As shown in the figures, in the lid 15, an opening 150 is formed at a position opposed to the opening 113 formed in the bottom 112 of the circular cylinder chamber 111 of the case 11. The opening 150 is for inserting the upper end portion 123b of the rotor body 121 of the rotor 12. In the outer peripheral surface 15a of the lid 15, a male screw portion 152 is formed. The male screw portion 152 is to be engaged with the female screw portion 117 formed on the opening side 118 of the sidewall surface 114 of the circular cylinder chamber 111. The lower surface (back surface) 153 of the lid 15 makes a gap g1 (See FIG. 3(A)) between this lower surface 153 and the upper surfaces 119 (the surfaces opposed to the lower surface 153 of the lid 15) of the partition members 115 formed in the circular cylinder chamber 111 of the case 11. The gap g1 functions as a flow path for the viscous fluid filled in the circular cylinder chamber 111. Further, the lower surface 153 of the lid 15 makes a gap g2 (See FIG. 3(B)) between the lower surface 153 and the upper surfaces 129 (the surfaces opposed to the lower surface 153 of the lid 15) of the vanes 122 of the rotor 12. The gap g2 also functions as a flow path for the viscous fluid filled in the circular cylinder chamber 111. These gaps g1 and g2 functioning as flow paths for the viscous fluid can be adjusted by adjusting the degree of screwing of the lid 15 into the case 11 (i.e. the length of engagement of the male screw portion 152 of the lid 15 and the female screw portion 117 of the case 11 with each other).

To prevent leakage of the viscous fluid from the opening 150 of the lid 15, a seal member such as an O-ring 16b (See FIGS. 3(A) and 3(B)) may be interposed between the upper end portion 123b of the rotor body 121 of the rotor 12 and the opening 150 of the lid 15. Similarly, to prevent leakage of the viscous fluid from the location of engagement of the male screw portion 152 of the lid 15 and the female screw portion 117 of the case 11 to the outside, a seal member such as an O-ring 16c (See FIGS. 3(A) and 3(B)) may be interposed between the outer peripheral surface 151 of the lid 15 and the sidewall 114 of the circular cylinder chamber 111.

In the rotary damper 1 having the above construction, when the rotor 12 (See FIG. 2(B)) rotates in the normal direction N relative to the circular cylinder chamber 111 of the case 11, the first leg portion 143 of the second seal member 14 is abutted against the side surface 127a of the vane 122, to close the flow path formed in the vane 122. At that time, the first seal member 13 (See FIG. 4(B)) fitted to each partition member 115 of the circular cylinder chamber 111 of the case 11 fills the gap between the end surface 116 of the partition member 115 and the outer peripheral surface 124 of the rotor body 121 of the rotor 12. And the second seal member 14 (See FIG. 4(B)) fitted to each vane 122 of the rotor 12 fills the gap between the end surface 125 of the vane 122 and the sidewall surface 114 of the circular cylinder chamber 114. As a result, movement of the viscous fluid filled in the circular cylinder chamber 111 is limited to movement through the gap g1 between the lower surface 153 of the lid 15 and the upper surfaces 119 of the partition members 115 and through the gap g2 between the lower surface 153 of the lid 15 and the upper surfaces 129 of the vanes 122. As a result, the pressure against the viscous fluid in the area 111a (See FIG. 2(B)) partitioned by the partition member 115 positioned on the side of the normal direction N of the vane 122 and this vane 122. Thereby, the large damping torque is generated.

Here, it is possible to adjust the gap g1 between the lower surface 153 of the lid 15 and the upper surface 119 of the partition member 115 and the gap g2 between the lower surface 153 of the lid 15 and the upper surface 129 of the vane 122 by adjusting the degree of screwing of the lid 15 into the case 11 (i.e. the length of engagement of the male screw portion 152 of the lid 15 and the female screw portion 117 of the case 11). As a result, it is possible to adjust the quantity of the viscous fluid that moves through these gaps g1 and g2, to adjust the damping torque generated by rotation.

On the other hand, when the rotor 12 (See FIG. 2(B)) rotates in the reverse direction R relative to the circular cylinder chamber 111 of the case 11, the first leg portion 143 of the second seal member 14 is separated from the side surface 127a of the vane 122, to open the flow path 126 formed in the vane 122. As a result, in addition to the movement through the gap g1 between the lower surface 153 of the lid 15 and the upper surface 119 of the partition member 115 and the movement through the gap g2 between the lower surface 153 of the lid 15 and the upper surface 129 of the vane 122, the movement of the viscous fluid filled in the circular cylinder chamber 111 through the flow path 126 formed in each vane 122 arises. Consequently, the pressure against the viscous fluid in the area 111b (See FIG. 2(B)) partitioned by the partition member 115 positioned on the side of the reverse direction R of the vane 122 and this vane 122 does not rise. Thereby, the small damping torque is generated.

Hereinabove, one embodiment of the present invention has been described.

According to the above embodiment, in the rotary damper 1 that generates damping torque against applied rotational force by limiting movement of the filled viscous fluid, it is possible to adjust the gap g1 between the lower surface 153 of the lid 15 and the upper surface 119 of the partition member 115 and the gap g2 between the lower surface 153 of the lid 15 and the upper surface 129 of the vane 122. Accordingly, the damping torque generated by rotation can be adjusted, in simple construction without increasing the number of parts, by simple work of adjusting the amount of movement of the viscous fluid that moves through the g1 and g2.

Further, in the present embodiment, the resin having superior sliding properties such as polyamide is used for the first seal member 13 and the second seal member 14. Thereby, the first seal member 13 and the second seal member 14 function as slide bearings for supporting slidably the outer peripheral surface 124 of the rotor body 121 of the rotor 12. Accordingly, it is possible to absorb backlash due to eccentricity or the like of the hexagon shaft that transmits rotational force applied from the outside to the rotor 12, so that the hexagon shaft rotates smoothly.

The present invention is not limited to the above embodiment, and can be variously changed within the scope of the invention.

For example, the above embodiment has been described taking the example where it is possible to adjust the gap g1 between the lower surface 153 of the lid 15 and the upper surface 119 of the partition member 115 and the gap g2 between the lower surface 153 of the lid 15 and the upper surface 129 of the vane 122 by adjusting the degree of screwing of the lid 15 into the case 11. However, in the present invention, it is sufficient that at least either the gap g1 between the lower surface 153 of the lid 15 and the upper surface 119 of the partition member 115 or the gap g2 between the lower surface 153 of the lid 15 and the upper surface 129 of the vane 122 can be adjusted. For example, the gap g1 may be closed by placing a seal member (which may be formed integrally with the first seal member 13) between the lower surface 153 of the lid 15 and the upper surface 119 of the partition member 115. In this case, the movement of the viscous fluid caused by rotation of the rotor 12 in the normal direction N relative to the circular cylinder chamber 111 of the case 11 is limited to movement through the gap g2 between the lower surface 153 of the lid 15 and the upper surface 129 of the vane 122, while the gap g2 can be adjusted by the degree of screwing of the lid 15 into the case 11. Or, the gap g2 may be closed by placing a seal member (which may be formed integrally with the respective second seal members 14) between the lower surface 153 of the lid 15 and the upper surface 129 of the vane 122. In this case, the movement of the viscous fluid caused by rotation of the rotor 12 in the normal direction N relative to the circular cylinder chamber of the case 11 is limited to movement through the gap g1 between the lower surface 153 of the lid 15 and the upper surface 119 of the partition member 115, while the gap g1 can be adjusted by the degree of screwing of the lid 15 into the case 11.

Further, the present invention has been described taking the example where the circular cylinder chamber 111 is provided with a pair of the partition members 115 and the rotor 12 is provided with a pair of vanes 122. The present invention, however, is not limited to this. As far as the number of partition members 115 formed in the circular cylinder chamber 111 is same as the number of vanes 122 formed on the rotor 12, the number of partition members 115 and the number of vanes may be one, three, or more.

Further, in the present invention, the second seal member 14 fitted onto the vane 122 functions as a check valve to open and close the flow path formed in the vane 122. The present invention, however, is not limited to this. A check valve may be provided separately from the second seal member 14 so that the check valve closes the flow path 126 formed in the vane 122 concerned when the rotor 12 rotates in the normal direction N relative to the circular cylinder chamber 111 of the case 11 and opens the flow path 126 formed in the vane 122 when the rotor 12 rotates in the reverse direction R relative to the circular cylinder chamber 111 of the case 11.

Further, in the present invention, the flow path 126 is formed in the vane 122, to run through between both side surfaces 127a and 127b of the vane 122, along the rotational direction of the rotor 12. The present invention is not limited to this. Instead of the flow path in the vane 122, or in addition to the flow path in the vane 122, a flow path may be formed in the partition member 115, to run through between both side surfaces of the partition member 115, along the rotational direction of the rotor 12. In that case, a check valve is provided so that the check valve closes the flow path 1101 formed in the partition member 115A (see Fig. 10) when the rotor 12 rotates in the normal direction N relative to the circular cylinder chamber 111 of the case 11 and opens the flow path formed in the partition member 115 when the rotor 12 rotates in the reverse direction R relative to the circular cylinder chamber 111 of the case 11.

In the case where the flow path is formed in the partition member 115, the first seal member 13 may be formed to have the same form as that of the second seal member 14. That is, the first seal member 13 comprises: a bottom having the width longer than the width of the outer side of the partition member 115, in the circumferential direction; a first leg portion which is formed integrally with the bottom at one end of the bottom and has the width longer than the width of the flow path formed in the partition member 115, in the radial direction; and a second leg portion which is formed integrally with the bottom at the other end of the bottom and has the width shorter than the width of the flow path formed in the partition member 115, in the radial direction. When the rotor 12 rotates in the normal direction N relative to the circular cylinder chamber 111 of the case 11, the first leg portion of the first seal member 13 is abutted against one side surface of the partition member 115, to close the flow path formed in the partition member 115. When the rotor 12 rotates in the reverse direction R relative to the circular cylinder chamber 111 of the case 11, the first leg portion of the first seal member 13 is separated from the side surface of the partition member 115, and the second leg portion is abutted against the other side surface of the partition member 115, to open the flow path formed in the partition member 115. By this construction, the first seal member 13 functions as a check valve.

Further, in the case where no flow path 126 is formed in the vanes 122, the second seal member 14 may have any form that can fill the gap between the end surface 15 of the vane 122 and the sidewall surface 114 of the circular cylinder chamber 111 of the case 11.

Further, the present embodiment has been described taking the example of a so-called unidirectional rotary damper in which larger damping torque is generated when the rotor 12 rotates in the normal direction N relative to the circular cylinder chamber 111 of the case 11, while smaller torque is generated when the rotor 12 rotates in the reverse direction R relative to the circular cylinder chamber 111 of the case 11. The present invention, however, is not limited to this. The present invention can be applied also to a so-called bidirectional rotary damper in which large damping torque is generated both in the normal direction N and in the reverse direction R. In that case, the flow path is omitted from the vane 122 of the rotor 12. Further, it is sufficient that the second seal member 14 can fill the gap between the end surface 125 of the vane 122 and the sidewall surface 114 of the circular cylinder chamber 111 of the case 11.

The rotary damper 1 of the present embodiment can be widely applied to reclining seats used in automobiles, railroad vehicles, airplanes, ships, and the like. Further, the rotary damper 1 of the present embodiment can be widely applied not only to reclining seats but also to devices that rotate in both directions and require damping of rotational movement in one direction.

REFERENCE SIGNS LIST

1: rotary damper; 11: case; 12: rotor; 13: first seal member; 14: second seal member; 15: lid; 16a, 16b, 16c: O-ring; 111: circular cylinder chamber; 112: bottom of the circular cylinder chamber 111; 113: opening of the circular cylinder chamber 111; 114: sidewall of the circular cylinder chamber 111; 115: partition member; 116: end surface of the partition member 115; 117: female screw portion; 118: opening side of the circular cylinder chamber 111; 119: upper surface of the partition member 115; 121: rotor body; 122: vane; 123a, 123b: end portion of the rotor body 121; 124: outer peripheral surface of the rotor body; 125: end surface of the vane 122; 126: flow path; 127a, 127b: side surface of the vane 122; 128: through-hole of the rotor body 121; 129: upper surface of the vane 122; 130: bottom of the first seal member; 140: bottom of the second seal member 14; 141, 142: end of the bottom 140 of the second seal member 14; 143: first leg portion of the second seal member 14; and 144: second leg portion of the second seal member.

The invention claimed is:

1. A rotary damper that generates damping torque against applied rotational force by limiting movement of viscous fluid, wherein:
the rotary damper comprises:
a case which is open at one end and has a circular cylinder chamber filled with the viscous fluid;
a rotor which is received in the circular cylinder chamber rotatably relative to the circular cylinder chamber; and
a lid which is fitted to an opening side of the circular cylinder chamber, to enclose the rotor together with the viscous fluid within the circular cylinder chamber;
the rotor comprises:
a rotor body of a circular cylinder shape; and
a vane which projects outward in radial direction from an outer peripheral surface of the rotor body, and an end surface of which comes close to a sidewall surface of the circular cylinder chamber so as to partition the circular cylinder chamber;
the case comprises:
a partition member which projects inward in a radial direction from the side wall surface of the circular cylinder chamber, and an end surface of which comes close to the outer peripheral surface of the rotor body so as to partition the circular cylinder chamber; and
a female screw portion formed in the sidewall surface of the circular cylinder chamber on the opening side of the circular cylinder chamber;
the lid comprises:
a male screw portion formed in an outer peripheral surface of the lid, to be engaged with the female screw portion formed in the sidewall surface of the circular cylinder chamber on the opening side of the circular cylinder chamber; and
a gap between a back surface of the lid and vanes' surface facing the back surface of the lid functions as a flow path that limit movement of the viscous fluid and can be adjusted by adjusting degree of screwing of the lid into the circular cylinder chamber; and
the rotary damper further comprises:
a first seal member attached the partition member, the first seal member filling both of a gap between the end surface of the partition member and the outer peripheral surface of the rotor body and a gap between the back surface of the lid and partition members' surface facing the back surface of the lid.

2. A rotary damper of claim 1, further comprising:
a second seal member which fills a gap between the end surface of the vane and the sidewall surface of the circular cylinder chamber.

3. A rotary damper of claim 2, wherein:
the rotary damper further comprises:
a flow path which is formed in the vanes, and runs through between both side surfaces of the vane along a rotational direction of the rotor; and
a second check valve which closes the flow path of the vane when the rotor rotates in a normal direction relative to the circular cylinder chamber, and opens the flow path of the vane when the rotor rotates in a reverse direction relative to the circular cylinder chamber; and
the second check valve is formed integrally with the second seal member.

4. A rotary damper of claim 2, further comprising:
a flow path which is formed in the partition member, and runs through between the side surfaces of the partition member along a rotational direction of the rotor; and
a first check valve which closes the flow path of the partition member when the rotor rotates in a normal direction relative to the circular cylinder chamber, and opens the flow path of the partition member when the rotor rotates in a reverse direction relative to the circular cylinder chamber.

5. A rotary damper of claim 3, further comprising:
a flow path which is formed in the partition member, and runs through between the side surfaces of the partition member along a rotational direction of the rotor; and
a first check valve which closes the flow path of the partition member when the rotor rotates in a normal direction relative to the circular cylinder chamber, and opens the flow path of the partition member when the rotor rotates in a reverse direction relative to the circular cylinder chamber.

6. A rotary damper of claim 2, further comprising:
a flow path which is formed in the vane, and runs through between both side surfaces of the vane along a rotational direction of the rotor; and
a second check valve which closes the flow path of the vane when the rotor rotates in a normal direction relative to the circular cylinder chamber, and opens the flow path of the vane when the rotor rotates in a reverse direction relative to the circular cylinder chamber.

7. A rotary damper of claim 1, further comprising:
a flow path which is formed in the partition member, and runs through between both side surfaces of the partition member along a rotational direction of the rotor; and
a first check valve which closes the flow path of the partition member when the rotor rotates in a normal direction relative to the circular cylinder chamber, and opens the flow path of the partition member when the rotor rotates in a reverse direction relative to the circular cylinder chamber; and
the first check valve is formed integrally with the first seal member.

8. A rotary damper of claim 7, further comprising:
a flow path which is formed in the vane, and runs through between both side surfaces of the vane along a rotational direction of the rotor; and
a second check valve which closes the flow path of the vane when the rotor rotates in a normal direction relative to the circular cylinder chamber, and opens the flow path of the vane when the rotor rotates in a reverse direction relative to the circular cylinder chamber.

9. A rotary damper claim 1, further comprising:
a flow path which is formed in the partition member, and runs through between the side surfaces of the partition member along a rotational direction of the rotor; and
a first check valve which closes the flow path of the partition member when the rotor rotates in a normal direction relative to the circular cylinder chamber, and opens the flow path of the partition member when the rotor rotates in a reverse direction relative to the circular cylinder chamber.

10. A rotary damper claim 1, further comprising:
a flow path which is formed in the vane, and runs through between both side surfaces of the vane along a rotational direction of the rotor; and
a second check valve which closes the flow path of the vane when the rotor rotates in a normal direction relative to the circular cylinder chamber, and opens the flow path of the vane when the rotor rotates in a reverse direction relative to the circular cylinder chamber.

* * * * *